US009417925B2

(12) United States Patent
Myrberg et al.

(10) Patent No.: US 9,417,925 B2
(45) Date of Patent: Aug. 16, 2016

(54) DYNAMIC FUNCTIONALITY PARTITIONING (71) Applicant: Microsoft Technology Licensing, LLC, Redmond, WA (US)

(72) Inventors: Mats Eric Myrberg, Seattle, WA (US); Gerald Reuben DeJean, III, Redmond, WA (US); Lance Eric Greenwade, Carnation, WA (US); Marc Tremblay, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 555 days.

(21) Appl. No.: 13/655,472

(22) Filed: Oct. 19, 2012

(65) Prior Publication Data

US 2014/0115128 A1 Apr. 24, 2014

(51) Int. Cl.
*G06F 15/16* (2006.01)
*G06F 15/177* (2006.01)
*G06F 9/50* (2006.01)
*G06F 15/173* (2006.01)

(52) U.S. Cl.
CPC ........ *G06F 9/5061* (2013.01); *G06F 2209/509* (2013.01)

(58) Field of Classification Search
CPC . H04N 5/2252; H04L 12/2803; H04W 84/18; G06F 9/5061; G06F 2209/509
USPC .................................. 709/232, 224; 370/328
See application file for complete search history.

(56) References Cited

U.S. PATENT DOCUMENTS

| | | | |
|---|---|---|---|
| 6,362,836 B1 * | 3/2002 | Shaw et al. | 715/744 |
| 6,859,831 B1 * | 2/2005 | Gelvin et al. | 709/224 |
| 7,020,701 B1 | 3/2006 | Gelvin et al. | |
| 7,463,968 B2 | 12/2008 | Snyder | |
| 7,887,235 B2 | 2/2011 | Campos et al. | |
| 7,921,312 B1 | 4/2011 | Pennanen et al. | |
| 2002/0181501 A1 | 12/2002 | Nova et al. | |
| 2004/0203708 A1 | 10/2004 | Khan et al. | |
| 2004/0243859 A1 | 12/2004 | Mueller et al. | |
| 2005/0120128 A1 * | 6/2005 | Willes et al. | 709/232 |
| 2005/0198214 A1 * | 9/2005 | Inoue | 709/219 |
| 2005/0234846 A1 * | 10/2005 | Davidson et al. | 707/1 |
| 2006/0072014 A1 | 4/2006 | Geng et al. | |
| 2006/0085534 A1 * | 4/2006 | Ralston et al. | 709/223 |

(Continued)

FOREIGN PATENT DOCUMENTS

WO    WO2006/080261    8/2006

OTHER PUBLICATIONS

PCT Search Report and Written Opinion mailed Aug. 4, 2014 for PCT Application No. PCT/US2013/065733, 9 Pages.

(Continued)

*Primary Examiner* — Melvin H Pollack
(74) *Attorney, Agent, or Firm* — Gregg R. Wisdom; Judy Yee; Micky Minhas (57) ABSTRACT

A sensor and processing system dynamically partitions functionality between various remote sensor nodes and a processing subsystem based on available communication capabilities. Redundant functionality is located at the processing subsystem and each of the various remote sensor nodes, and each sensor node coordinates with the processing subsystem to determine the location (e.g., at the processing subsystem or at the sensor node) at which a particular functionality is executed.

20 Claims, 7 Drawing Sheets

(56) References Cited

U.S. PATENT DOCUMENTS

| | | |
|---|---|---|
| 2007/0236345 A1 | 10/2007 | Yu et al. |
| 2008/0235519 A1 | 9/2008 | Onouchi et al. |
| 2009/0033155 A1 | 2/2009 | Kanno et al. |
| 2009/0061954 A1 | 3/2009 | Syed |
| 2010/0005483 A1* | 1/2010 | Rao .................................. 725/25 |
| 2010/0114826 A1 | 5/2010 | Voutilainen et al. |
| 2010/0183153 A1 | 7/2010 | Cho et al. |
| 2010/0256914 A1 | 10/2010 | Hutin et al. |
| 2010/0278086 A1 | 11/2010 | Pochiraju et al. |
| 2010/0330927 A1 | 12/2010 | Cherukuri et al. |
| 2011/0035491 A1 | 2/2011 | Gelvin et al. |
| 2011/0119045 A1 | 5/2011 | Durand et al. |
| 2011/0134832 A1* | 6/2011 | Soliman ........................ 370/328 |
| 2011/0283235 A1 | 11/2011 | Kling et al. |
| 2012/0272086 A1 | 10/2012 | Anderson et al. |
| 2013/0238912 A1 | 9/2013 | Priel et al. |
| 2014/0086121 A1 | 3/2014 | Emeott et al. |
| 2014/0115366 A1 | 4/2014 | Joo et al. |
| 2015/0323980 A1 | 11/2015 | Myrberg et al. |

OTHER PUBLICATIONS

Newton, et al., "Wishbone: Profile-based Partitioning for Sensornet Applications", Retrieved at <<http://www.usenix.org/event/nsdi09/tech/full_papers/newton/newton.pdf>>, NSDI '09: 6th USENIX Symposium on Networked Systems Design and Implementation, Apr. 2009, pp. 395-408.

Chun, et al., "Dynamically Partitioning Applications between Weak Devices and Clouds", Retrieved at <<http://berkeley.intel-research.net/bgchun/dynamic-partitioning-mcs10.pdf>>, MCS Jun. 15, 2010, San Francisco, CA, USA, Jun. 15, 2010, pp. 5.

Hill, et al., "A wireless embedded sensor architecture for system-level optimization", Retrieved at <<http://citeseer.ist.psu.edu/viewdoc/download;jsessionid=8A50DC11D9C55595975225DB104D8DF7?doi=10.1.1.12.6612&rep=rep1&type=pdf >>, ece, UC Berkeley, Oct. 2002, pp. 21.

"Amazon Silk Revolutionary Cloud-Accelerated Split Browser", <<Retrieved at http://www.amazon.com/Kindle-Color-Multi-touch-Display-Wi-Fi/dp/B0051VV0B2/ref=amb_link_357575542_4?pf_rd_m=ATVPDKIKX0DER&pf_rd_s=gateway-center-column&pf_rd_r=0N625M4JAW6DBV6QKRXA&pf_rd_t=101&pf_rd_p=1321408942&pf_rd_i=507846#silk>>, Retrieved Date: Dec. 9, 2011, pp. 11.

Bhattacharjee, et al., "Full-System Chip Multiprocessor Power Evaluations Using FPGA-Based Emulation", Retrieved at <<http://ieeexplore.ieee.org/stamp/stamp.jsp?tp=&arnumber=5529025>>, Low Power Electronics and Design (ISLPED), 2008 ACM/IEEE , Aug. 8, 2008, pp. 335-340.

"Intel Turbo Boost Technology—On Demand Processor Performance", Retrieved at <<http://www.intel.com/content/www/us/en/architecture-and-technology/turbo-boost/turbo-boost-technology.html>>, Retrieved Date: Apr. 13, 2012, pp. 2.

"Foxton Technology", Retrieved at <<http://en.wikipedia.org/wiki/Foxton_Technology>>, Sep. 13, 2010, pp. 2.

"FPGA Power Management and Modeling Techniques", Retrieved at <<http://www.altera.com/literature/wp/wp-01044.pdf>>, Dec. 2010, pp. 9.

"Power Management Resource Center", Retrieved at <<http://www.altera.com/support/devices/power/pow-power.html>>, Jan. 1, 2010, pp. 6.

Office action for U.S. Appl. No. 13/655,470, mailed on Nov. 6, 2014, Greenwade et al., "Energy Management by Dynamic Functionality Partitioning", 8 pages.

PCT Search Report and Written Opinion mailed Sep. 25, 2014 for PCT Application No. PCT/US2013/065726, 10 Pages.

Written Opinion mailed Nov. 27, 2014 for PCT Application No. PCT/US2013/065733, 5 Pages.

PCT International Preliminary Report on Patentability mailed Feb. 24, 2015 for PCT Application No. PCT/US2013/065733, 8 Pages.

* cited by examiner

DYNAMIC FUNCTIONALITY PARTITIONING

CROSS-REFERENCE TO RELATED APPLICATIONS

The present application is related to U.S. patent application Ser. No. 13/655,470, entitled "Energy Management by Dynamic Functionality Partitioning" filed Oct. 19, 2012, which is specifically incorporated herein by reference for all that it discloses and teaches.

BACKGROUND

Microelectronic circuitry continues to implement increasingly complex functionality. In many implementations, dedicated microelectronic circuitry is employed to form a particular configuration of dedicated sensor nodes and primary processors (e.g., sensors that are wirelessly (or through wires) coupled to one or more processing units). However, environmental conditions can make that particular configuration suboptimal during operation. For example, the power and communication bandwidth available to remote sensors may be different (e.g., more power but less bandwidth) in a given scenario than that envisioned in the original design. As such, a system including such remote sensors may perform better in the operating environment if the functionality between the remote sensors and a central data processing sub-system had been better optimized for the available power, the thermal environment, and the communication capabilities (e.g., to increase data preprocessing at the remote sensors and to decrease or otherwise change the communication requirements between the sensors and the central system). Furthermore, these factors change over time, so no static design will address all operational circumstances. Existing systems do not provide for dynamic partitioning of functionality between a central data processing subsystem and one or more remote sensors.

SUMMARY

Implementations described and claimed herein address the foregoing problems by providing a system that dynamically partitions or allocates the functionality between various remote sensor nodes and a processing subsystem based on available communication capabilities, such as data traffic, congestion, noise, etc. Redundant functionality is located at the processing subsystem and each of the various remote sensor nodes, and each sensor node coordinates with the processing subsystem to determine the location (e.g., at the processing subsystem or at the sensor node) at which a particular functionality is executed.

This Summary is provided to introduce in a simplified a selection of concepts form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

In one example environment, multiple sensor nodes are distributed throughout the environment, reporting sensed data to a processing subsystem. For example, traffic cameras may be distributed throughout an urban center, transmitting streamed video or static images to a traffic center for use in monitoring vehicle flow and commuter conditions in the city. The traffic center may use such traffic information to adjust traffic signal frequencies, deploy emergency personnel, etc. The traffic center may also provide such traffic information via a traffic website or television broadcast. It should understood, however, that other types of sensor nodes and processing subsystems may also be employed within the scope of the described technology, including without limitation cameras and microphones in a console gaming environment, chemical detectors in a manufacturing environment, microphones and infrared cameras in a security environment, pressure sensors in a pumping station, etc.

A system implementation disclosed herein includes multiple sensor nodes and a processing subsystem that processes the sensor data from the sensor nodes. Such systems may be configured to accommodate the large amount of sensor data coming from the various sensor nodes to the processing subsystem based on various operating conditions and parameters. In an example implementation, where the sensor nodes are communicating with the processing subsystem via wireless communications network, the bandwidth available for communications between the processing subsystem and the sensor nodes can vary significantly depending on the wireless interference conditions. In such an implementation, the available bandwidth can vary based on assorted operating conditions, such as the maximum bandwidth available on in the wireless network, the amount of interference impacting the network, the amount of sensor data to be transmitted, the frequency of data transmission, the level applied to the communicated data, etc.

To account for this variability in communications, a sensor node may vary the amount of preprocessing it performs on the sensor data prior to transmitting the sensor data to the processing subsystem. In one implementation, both the sensor nodes and the processing subsystem employ complimentary preprocessing functionality that can be dynamically allocated between the processing subsystem and individual sensor nodes. Depending on the available communications bandwidth, the system may choose to do more or less preprocessing of the sensor data on the sensor nodes themselves, thus adjusting the amount of wireless bandwidth required at any given time.

Figure 1:
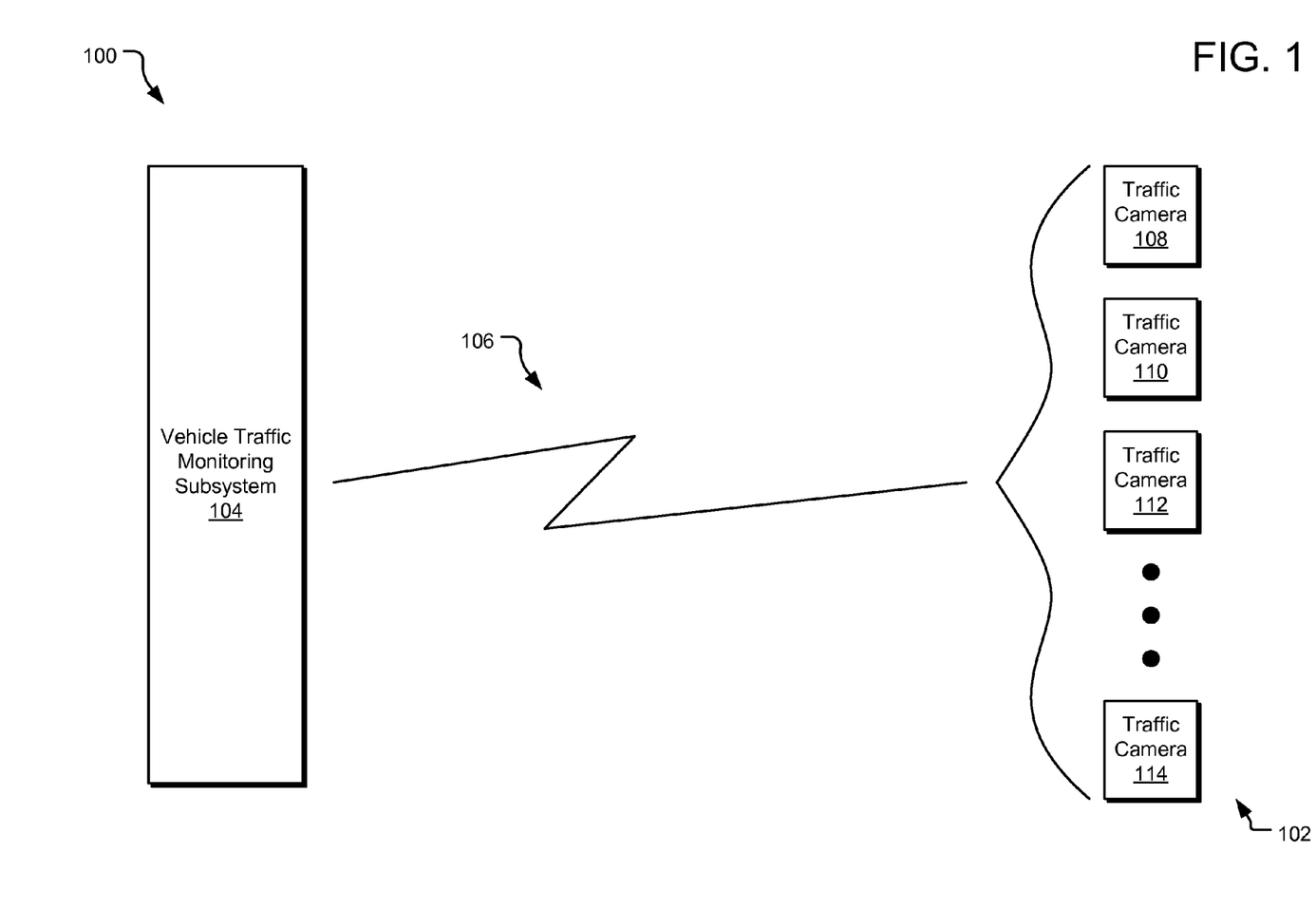
FIG. 1 illustrates an example system of sensor nodes and a processing subsystem employing dynamic functionality partitioning.

FIG. 1 illustrates an example system 100 of sensor nodes (e.g., traffic cameras 102) and a processing subsystem (e.g., a vehicle traffic monitoring subsystem 104) employing dynamic functionality partitioning. In FIG. 1, the system 100 is depicted and described with regard to a traffic monitoring system, although such systems may be employed in other applications, including security monitoring, chemical processing monitoring, weather monitoring, gaming, medical treatment, etc.

In the illustrated example, the vehicle traffic monitoring subsystem 104 operates to receive and process sensor data received from the various traffic cameras 102. The communications channel (illustrated by wireless connection 106) may be wired (including digital or analog signaling) or wireless (including radio-frequency or optical signaling), depending on the system needs. In some implementations, the communications channel for one sensor node may be wireless while the communication channels for another sensor node may be wired. Accordingly, the dynamic partitioning for any individual sensor node may be independent of the dynamic partitioning for another individual sensor node. Nevertheless, this feature does not preclude the interaction between or among individual sensor nodes, as described below in more detail.

Although the vehicle traffic monitoring subsystem 104 and the traffic cameras 102 may be implemented by discrete components, a technology that can contribute to dynamic functionality partitioning is referred to as a system-on-a-chip (SOC) in which most or all components of a sensor node are integrated into an integrated circuit (IC) that may contain without limitation digital, analog, mixed-signal, optical, radio-frequency, central processing units, preprocessors, and memory components. By integrating such sensor components with individual preprocessors (e.g., image and video preprocessing accelerators, voice/audio preprocessors, digital signal processors (DSPs), communication monitors, power monitors, motion detectors, etc.) and other components, an individual sensor node may provide a wide selection of functionality, which, depending on the context, may be executed by the sensor node or offloaded to the vehicle traffic monitoring 104. The described technology can dynamically adjust the allocation of such functionality between and among such devices.

In one example, the traffic cameras 102 are monitoring vehicle traffic throughout an urban center and transmitting video data back to the vehicle traffic monitoring subsystem 104 for review by traffic controllers, television and radio news personnel, etc. The communication requirements of such a traffic monitoring system may be significant, as higher resolution and higher frame rates captured by multiple traffic cameras 102 can result in a large amount of video data per second being communicated by each camera to the vehicle traffic monitoring subsystem 104. In one implementation, a single frame of video data may contain hundreds of kilobytes of image data, depending on the resolution of the image, and video frames are typically transmitted at approximately 30 frames per second, although both resolution and frame rate may vary. Accordingly, although various techniques for video compression are available, transmission bit rates of between 0.7 Mbps and 2000 Mbps may be employed for different resolutions and frame rates. In addition, many video systems are configured to allot 25% of the available bandwidth as unused to allow for occasional bursts of video data as well as other communication applications, such as VoIP and other side-channel communications. These factors may further be accommodated by dynamic partitioning of various preprocessing functions at the sensor node, including compression, noise cancelling, smoothing, spatial normalization, etc., to increase or decrease the bandwidth requirements of an individual sensor node at any particular point in time.

As a further illustration, assume the traffic cameras 108, 110, 112, and 114 are distributed at different intersections in the urban center. Each traffic camera is initially configured to transmit its video to the vehicle traffic monitoring subsystem 104 at 25 fps and at 720×480 resolution, calling for a bandwidth range of 750-1000 kbps for raw video data. If the traffic camera 108 detects dropped packets or other evidence of congestion or constrained bandwidth, the traffic camera can enable one or more of its preprocessing accelerators to compress the video stream for better use of the available bandwidth. Examples of compression may include lossless compression, lossy compression, spatial image compression, temporal motion compensation, etc.

For example, the traffic camera 108 may be located at a busy intersection. As such, in response to a detection of network congestion, the traffic camera 108 may perform lossy spatial image compression to reduce its bandwidth needs while maintaining an acceptable loss of fidelity (e.g., the video data transmitted may be at a lower level of resolution or a high level of lossy compression that is nevertheless acceptable for traffic monitoring purposes). In contrast, the traffic camera 110 may be located at an intersection that is not busy and therefore, many frames captured at the intersection by the traffic camera 110 exhibit few differences from each other. As such, the traffic camera 110 may select a temporal motion compression preprocessor to reduce its communication requirements instead of the spatial image compression preprocessor used by the traffic camera 108. Further, the traffic camera 112 does not experience bandwidth constraints and therefore proceeds to transmit raw video data to the vehicle traffic monitoring subsystem 104 without any preprocessing on its part. Other factors that may be considered by each traffic camera may include without limitation time of day, date, available power, parameters specified by the vehicle traffic monitoring subsystem 104 (e.g., desired resolution or frame rate), etc. In this context, individual traffic cameras can dynamically select among multiple preprocessors on an individual basis, depending on the image content, available bandwidth, available power, and other factors identified by each traffic camera.

Further, where certain functionality is omitted (via dynamic partitioning) at a sensor node, the functionality may be provided by a complimentary preprocessor at the vehicle traffic monitoring subsystem 104. For example, should the traffic camera 108 omit a noise cancellation function from its preprocessing of the captured video, the vehicle traffic monitoring subsystem 104 may therefore enable noise cancellation preprocessor at its side of the communication channel to improve the video quality. In one implementation, the vehicle traffic monitoring subsystem 104 and individual traffic cameras are in communication about the preprocessing each traffic camera and the vehicle traffic monitoring subsystem 104 are able to provide or are requested to provide. For example, the traffic camera 110 at the empty intersection may be sending 25 fps of similar frame (e.g., because there is no traffic at the intersection). The vehicle traffic monitoring subsystem 104 may notice this similarity between successive frames and suggest to the traffic camera 110 that it reduce the frame rate until and unless it detects additional traffic. Accordingly, the vehicle traffic monitoring subsystem 104 may engage a motion detection preprocessor to evaluate individual frames in order to adjust its frame rate as requested by the vehicle traffic monitoring subsystem 104. Many other examples of interaction between the vehicle traffic monitoring subsystem 104 and individual traffic cameras are contemplated.

It should also be understood that implementations of the presently described technology may include communicative cooperation among multiple sensor nodes, whether orchestrated between or among peer sensor nodes or via communications with the processing subsystem. In one implementation, if two sensor nodes overlap in their sensing coverage, such as two cameras having image capture regions that overlap, the sensor nodes may partition certain functionality with the processing subsystem differently based on that knowledge. For example, if the traffic camera 108 and the traffic camera 114 cover the same intersection from slightly different perspectives and the traffic camera 108 has a higher bandwidth communications channel to the vehicle traffic monitoring subsystem 104 than the traffic camera 114, then the traffic camera 108 may send raw video data to the vehicle traffic monitoring system 104 while the traffic camera 114 enables its on-board lossy compression preprocessor and its temporal motion compensation preprocessor to reduce its bandwidth needs. In this scenario, coordination of the overlapping cameras allows dynamic functionality partitioning decisions to be made in a cooperative manner among multiple sensor nodes.

Figure 2:
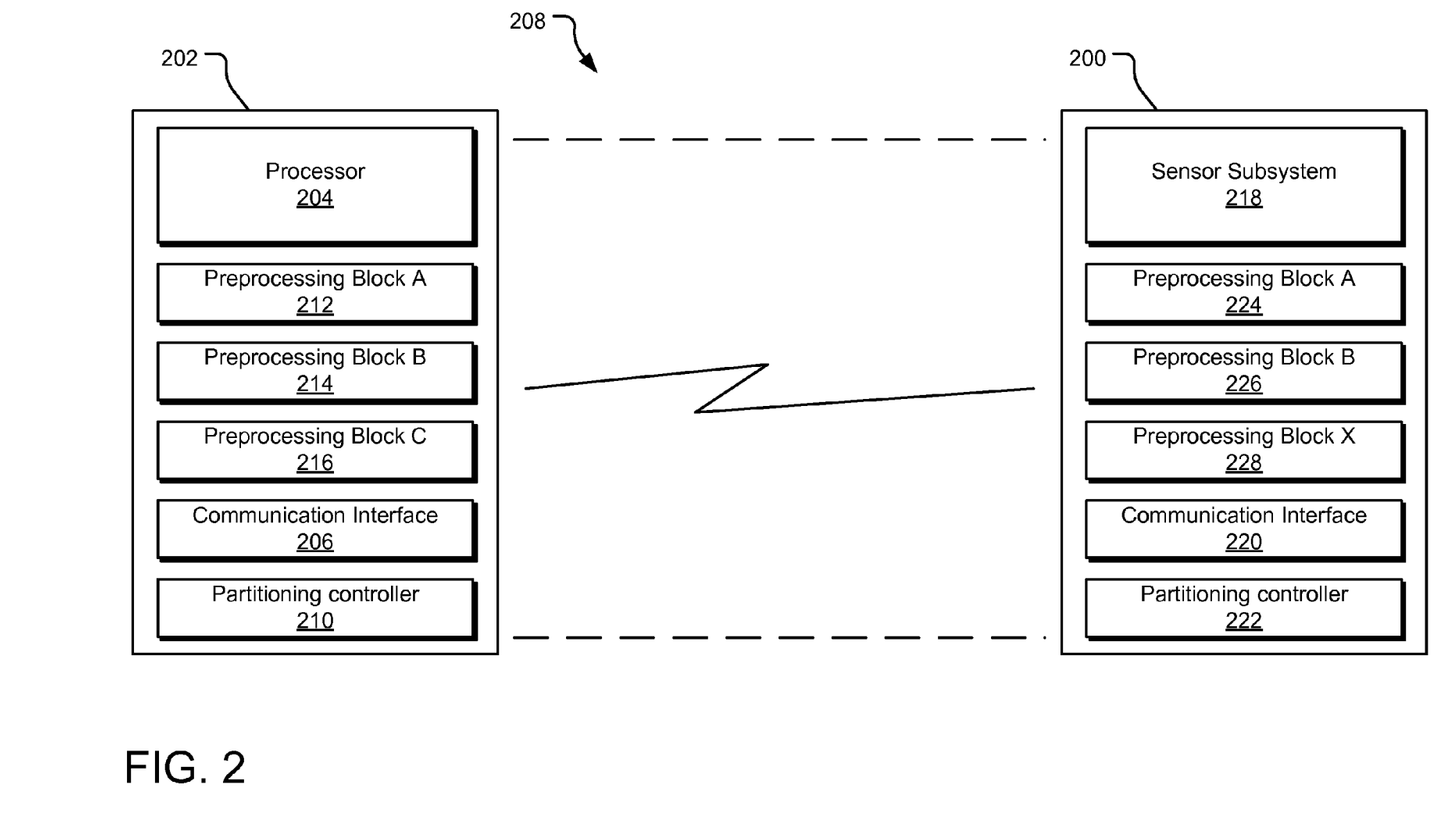
FIG. 2 illustrates an example sensor node and an example processing subsystem exploiting a large communication bandwidth by dynamic functionality partitioning.

FIG. 2 illustrates an example sensor node 200 and an example processing subsystem 202 exploiting a large communication bandwidth by dynamic functionality partitioning. The processing subsystem 202 is configured to receive a sensor data stream (e.g., video data) from the sensor node 200 and process it for broadcast, storage, editing, etc. The processing subsystem 202 includes a processor 204 (e.g., a CPU) responsible for the primary processing operations of the processing subsystem 202. The processing subsystem 202 also includes a communication interface 206 for communicating with the sensor node 200 and potentially other sensor nodes in a sensor network. The communication interface 206 receives and sends data from and to the sensor node 200 via a communications channel 208, which is illustrated as having a large bandwidth at the depicted point in time. As previously discussed, the communications channel 208 may be wired or wireless, depending on the configuration of the individual node. Further, the communications channel 208 may be implemented through a dedicated or shared communications channel (e.g., a wire or optical signal) or through a complex logical network, such as the Internet.

The processing subsystem 202 also includes a partitioning controller 210, which interacts with the sensor node 200 and the sensor data that the processing subsystem 202 receives to negotiate the appropriate dynamic partitioning of functionality between the processing subsystem 202 and a partitioning controller 222 of the sensor node 200. Further, the processing subsystem 202 includes multiple preprocessing blocks (e.g., preprocessing block A 212, preprocessing block B 214, and preprocessing block C 216), which are selected to preprocess the received sensor data before passing it to the processor 204. For example, if the processing subsystem 202 receives raw video data from the sensor node 200, the preprocessing block A 212 may compress the raw video data according to the H.264 standard before passing the compressed sensor data to the processor 204 for processing.

A preprocessing block may consist of circuitry and potentially software/firmware to implement a specific preprocessing operation. In some cases, the preprocessing block may include circuitry in the form of a discrete or integrated accelerator to allow the processor or a sensor subsystem to offload certain processing operations to a separate processing component. Example preprocessing blocks may include without limitation a graphics accelerator, a compression accelerator, a noise cancellation processor, etc. In one implementation, a sensor subsystem and one or more preprocessors are integrated into an SOC, which may also include a communication interface, a partitioning controller, and other integrated components.

In one implementation, the communication interface 206 of the processing subsystem 202 can detect congestion or other constraints on bandwidth in the communications channel 208. Such detection may be accomplished by receipt of congestion signals from the sensor node 200, a monitoring of dropped packets or lost ACK (acknowledgement) packets, or other communication feedback. Further, the processing node 202 may receive instructions from the sensor node 200 to alter its preprocessing functionality or communications. For example, the sensor node 200 may instruct the processing subsystem 202 to stop its compression (e.g., performed by preprocessing block A 212) as the sensor node 200 will be compressing the video prior to transmission using its own preprocessing block A 224. In response to such instructions, the processing subsystem 202 may disable its compression preprocessor (i.e., preprocessing block A 212) to implement the instruction.

The sensor node 200 is configured to sense data in its environment, such as video data as a camera, audio data as a microphone, temperature data as a thermocouple, etc. The sensor node 200 contains a sensor subsystem 218 that may include an integrated interface to a discrete sensor (e.g., for a camera) or may include an integrated combination of the sensor and the sensor interface (e.g., for a photodiode). The sensor data detected by the sensor subsystem 218 may be communicated directly to the processor subsystem 202 via a communication interface 220 and the communications channel 208 without preprocessing or through one or more preprocessors prior to transmission to the processor subsystem 202 via the communication interface 220 and the communications channel 208.

The sensor node 200 includes multiple preprocessing blocks (e.g., preprocessing block A 224, preprocessing block B 226, and preprocessing block X 228). Note that two of the preprocessing blocks in the sensor node 200 have corresponding counterparts in the processing subsystem 202 (i.e., preprocessing block A 212 and preprocessing block B 214) and one of the preprocessing blocks is unique to the sensor node 200 (i.e., preprocessing block X 228), although other sensor nodes may also have their own preprocessing blocks X. Likewise, the preprocessing block C 216 in the processing subsystem 202 is unique to that subsystem. As previously discussed, the sensor node 200 also includes the partitioning controller 222.

In one implementation, the communication interface 220 of the sensor node 200 can detect congestion or other constraints on bandwidth in the communications channel 208. Such detection may be accomplished by receipt of congestion signals from the processing subsystem 202, a monitoring of dropped packets or lost ACK (acknowledgement) packets, or other communication feedback. Further, the sensor node 200 may receive instructions from the processing subsystem 202 to alter its preprocessing functionality or communications. For example, the processing subsystem 202 may instruct the sensor node 200 to increase the transmitted frame rate when motion is detected by the sensor node 200. In response to such instructions, the sensor node 200 may enable a motion detection preprocessor (e.g., such as the preprocessing block X 228) to implement the instruction.

It should be understood that a one-to-one correspondence in preprocessors, as shown in FIG. 2, is only an example of the preprocessing configurations available to processing subsystems and sensor nodes. While some preprocessors in the sensor node may provide the same functionality as some preprocessors in the processing subsystem, there may also be preprocessors in the sensor node that are unique to the sensor node, as compared to the processing subsystem, and vice versa. Further, the functionality of certain preprocessors in the sensor node may overlap with the functionality of certain preprocessor in the processor subsystem, and vice versa. For example, a preprocessor in the processor subsystem may provide the functionality of two preprocessors or two and half preprocessors in the sensor node, or vice versa.

Figure 3:
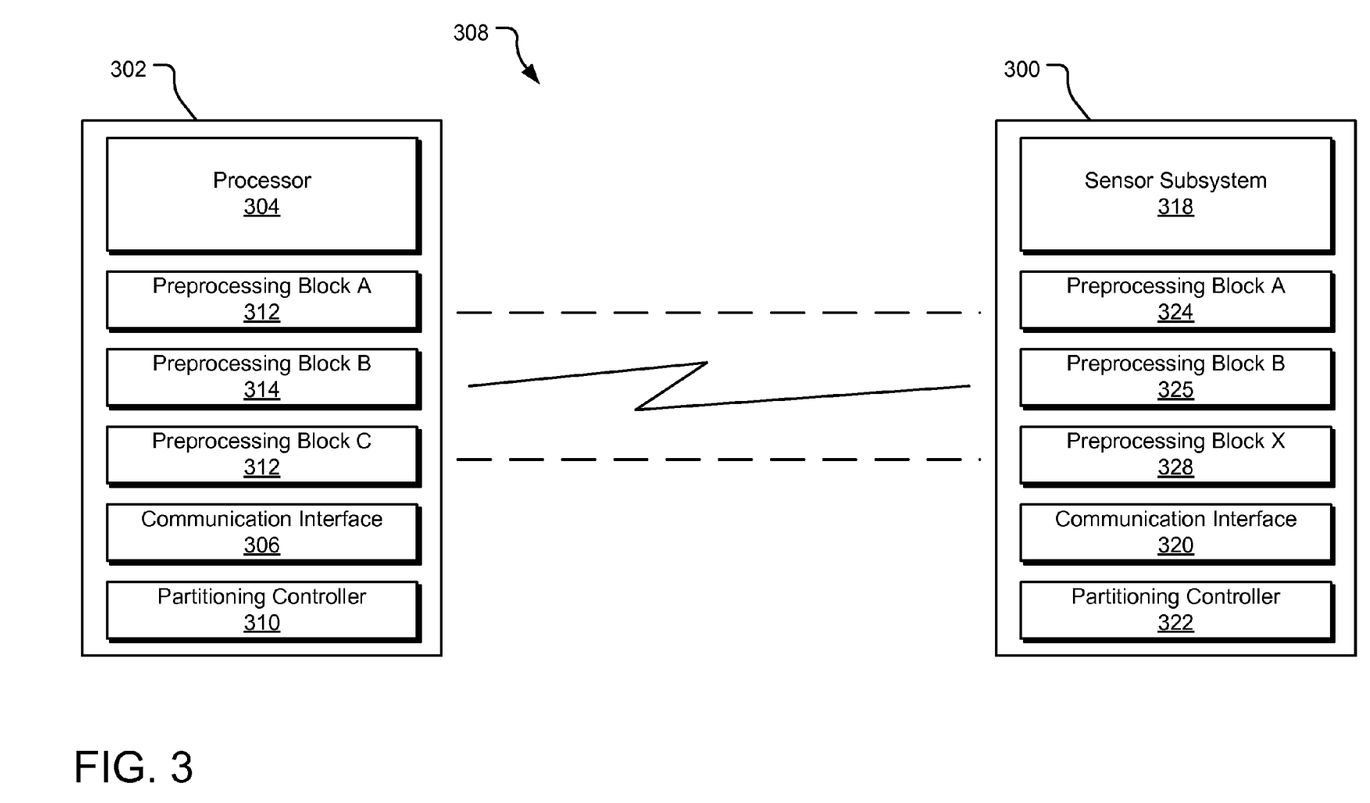
FIG. 3 illustrates an example sensor node and an example processing subsystem exploiting a small communication bandwidth by dynamic functionality partitioning.

FIG. 3 illustrates an example sensor node 300 and an example processing subsystem 302 exploiting a small communication bandwidth by dynamic functionality partitioning. The processing subsystem 302 is configured to receive a sensor data stream (e.g., video data) from the sensor node 300 and process it for broadcast, storage, editing, etc. The processing subsystem 302 includes a processor 304 (e.g., a CPU), responsible for the primary processing operations of the processing subsystem 302. The processing subsystem 302 also includes a communication interface 306 for communicating with the sensor node 300 and potentially other sensor nodes in a sensor network. The communication interface 306 receives and sends data from and to the sensor node 300 via a communications channel 308, which is illustrated as having a constrained bandwidth at the depicted point in time. As previously discussed, the communications channel 308 may be wired or wireless, depending on the configuration of the individual node. Further, the communications channel 308 may be implemented through a dedicated or shared communications channel (e.g., a wire or optical signal) or through a complex logical network, such as the Internet.

The processing subsystem 302 also includes a partitioning controller 310, which interacts with the sensor node 300 and the sensor data that the processing subsystem 302 receives to negotiate the appropriate dynamic partitioning of functionality between the processing subsystem 302 and a partitioning controller 322 of the sensor node 300. Further, the processing subsystem 302 includes multiple preprocessing blocks (e.g., preprocessing block A 312, preprocessing block B 314, and preprocessing block C 316), which are selected to preprocess the received sensor data before passing it to the processor 304. For example, if the processing subsystem 302 receives raw video data from the sensor node 300, the preprocessing block A 312 may compress the raw video data according to the H.264 standard before passing the compressed sensor data to the processor 304 for processing.

In one implementation, the communication interface 306 of the processing subsystem 302 can detect congestion or other constraints on bandwidth in the communications channel 308. Such detection may be accomplished by receipt of congestion signals from the sensor node 300, a monitoring of dropped packets or lost ACK (acknowledgement) packets, or other communication feedback. Further, the processing node 302 may receive instructions from the sensor node 300 to alter its preprocessing functionality or communications. For example, the sensor node 300 may instruct the processing subsystem 302 to stop its compression (e.g., performed by preprocessing block A 312) as the sensor node 300 will be compressing the video prior to transmission using its preprocessing block A 324. In response to such instructions, the processing subsystem 302 may disable its compression preprocessor (i.e., preprocessing block A 312) to implement the instruction.

The sensor node 300 is configured to sense data in its environment, such as video data as a camera, audio data as a microphone, temperature data as a thermocouple, etc. The sensor node 300 contains a sensor subsystem 318 that may include an integrated interface to a discrete sensor (e.g., for a camera) or may include an integrated combination of the sensor and the sensor interface (e.g., for a photodiode). The sensor data detected by the sensor subsystem 318 may be communicated directly to the processor subsystem 302 via a communication interface 320 and the communications channel 308 without preprocessing or through one or more preprocessors prior to transmission to the processor subsystem 302 via the communication interface 320 and the communications channel 308.

The sensor node 300 includes multiple preprocessing blocks (e.g., preprocessing block A 324, preprocessing block B 326, and preprocessing block X 328). Note that two of the preprocessing blocks in the sensor node 300 have counterparts in the processing subsystem 302 (i.e., preprocessing block A 312 and preprocessing block B 314) and one of the preprocessing blocks is unique to the sensor node 300 (i.e., preprocessing block X 328), although other sensor nodes may also have their own preprocessing blocks X. Likewise, the preprocessing block C 316 in the processing subsystem 302 is unique to that subsystem. As previously discussed, the sensor node 300 also includes the partitioning controller 322.

In one implementation, the communication interface 320 of the sensor node 300 can detect congestion or other constraints on bandwidth in the communications channel 308. Such detection may be accomplished by receipt of congestion signals from the processing subsystem 302, a monitoring of dropped packets or lost ACK (acknowledgement) packets, or other communication feedback. Further, the sensor node 300 may receive instructions from the processing subsystem 302 to alter its preprocessing functionality or communications. For example, the processing subsystem 302 may instruct the sensor node 300 to increase the transmitted frame rate when motion is detected by the sensor node 300. In response to such instructions, the sensor node 300 may enable a motion detection preprocessor (e.g., such as the preprocessing block X 328) to implement the instruction.

Figure 4:
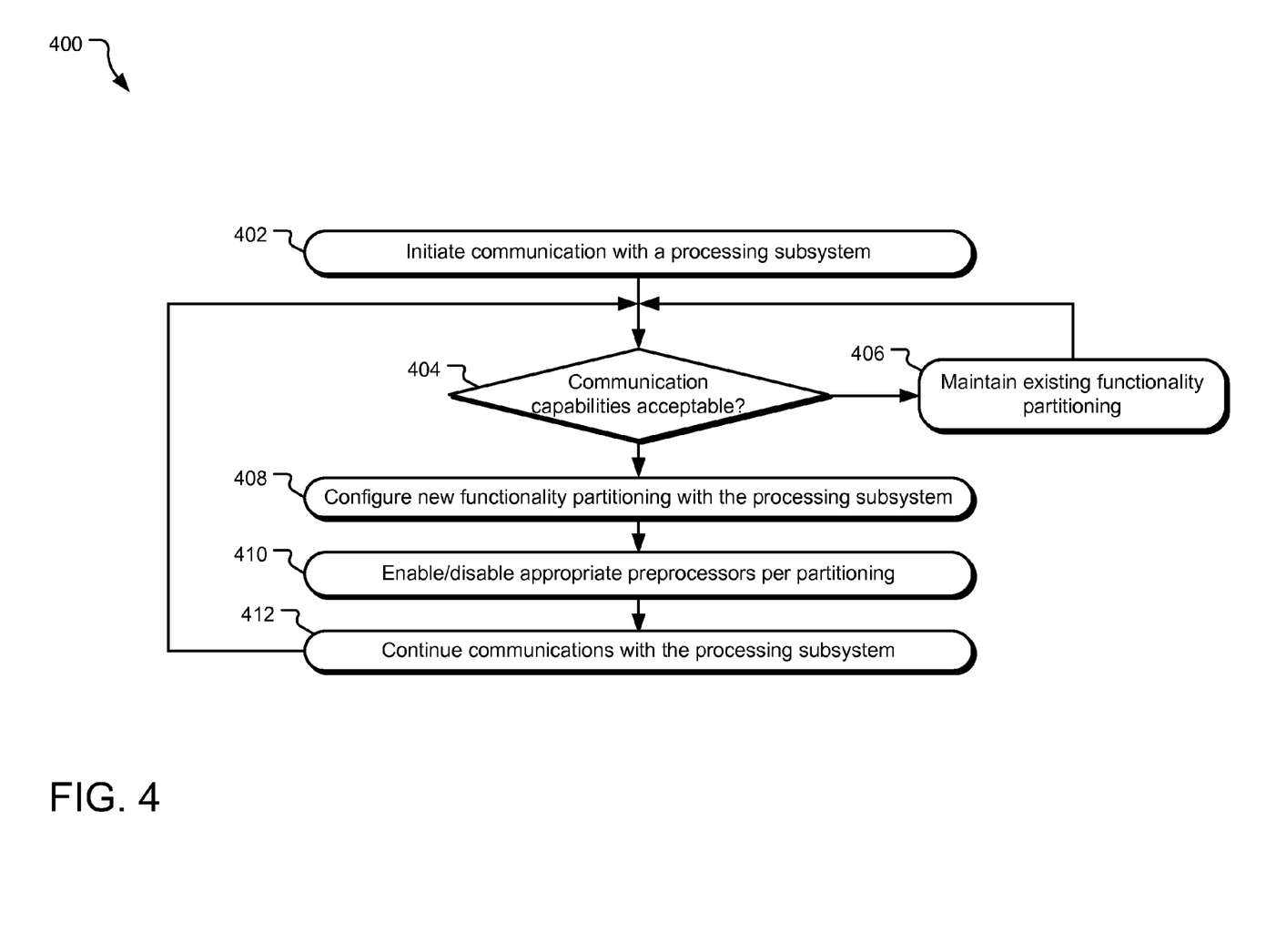
FIG. 4 illustrates operations for dynamically partitioning functionality from the perspective of a sensor node.

FIG. 4 illustrates operations 400 for dynamically partitioning functionality from the perspective of a sensor node. A communications operation 402 initiates communications with a processing subsystem. As previously discussed, such communications may be accomplished via a variety of communications channels. A communications monitoring operation 404 monitors the communications capabilities of the communications channel (e.g., available bandwidth, congestion, jitter, dropped packets, delay in delivery to destination, etc.). If the communications capabilities of the communications channel are acceptable for the current operation of the sensor node and the processing subsystem, the existing partitioning of functionality is maintained between the sensor node and the processing subsystem by operation 406, and communication continues.

The communications capabilities of the communication channel are periodically re-evaluated by the communications monitoring operation 404. If the communications capabilities of the communications channel become inadequate (e.g., excessive packets are being dropped) for the current operation of the sensor node and the processing subsystem, a configuring operation 408 reallocates functionality between the sensor node and the processing subsystem (e.g., to repartition the overall system functionality). Responsive to the configuring operation 408, a preprocessor selection operation 410 enables or disables select preprocessors in the sensor node in accordance with the new functionality partitioning. A communications operation 412 continues the communication of sensor data between the sensor node and the processing subsystem, subject to the new functionality partitioning, and the new communications arrangement is periodically re-evaluated by the communications monitoring operation 404. After each repartitioning operation 410, the sensor data stream is changed in some way (e.g., to a different type or level of compression, to a different level of noise cancellation, etc.). In one perspective, the original sensor data stream terminates and a second sensor data stream commences.

For example, if the communications capabilities improve to provide additional available bandwidth, the sensor node may elect to send uncompressed data to the processing subsystem to take advantage of the additional bandwidth. In such a case, the processing subsystem may be instructed to (or may automatically) perform compression of the received sensor data using one of its own preprocessor blocks. In contrast, if the communications capabilities degrade to further constrain the available bandwidth, the sensor node may elect to send fewer frames per second or perform spatial image compression or temporal motion compensation via one of its preprocessors to accommodate the drop in bandwidth. Such accommodations may be negotiated back and forth between the sensor node and the processing subsystem or simply imposed by instruction by one or the other. Accordingly, the new functionality partitioning adjusts the communications requirements and/or utilization between the sensor node and the processing subsystem.

Figure 5:
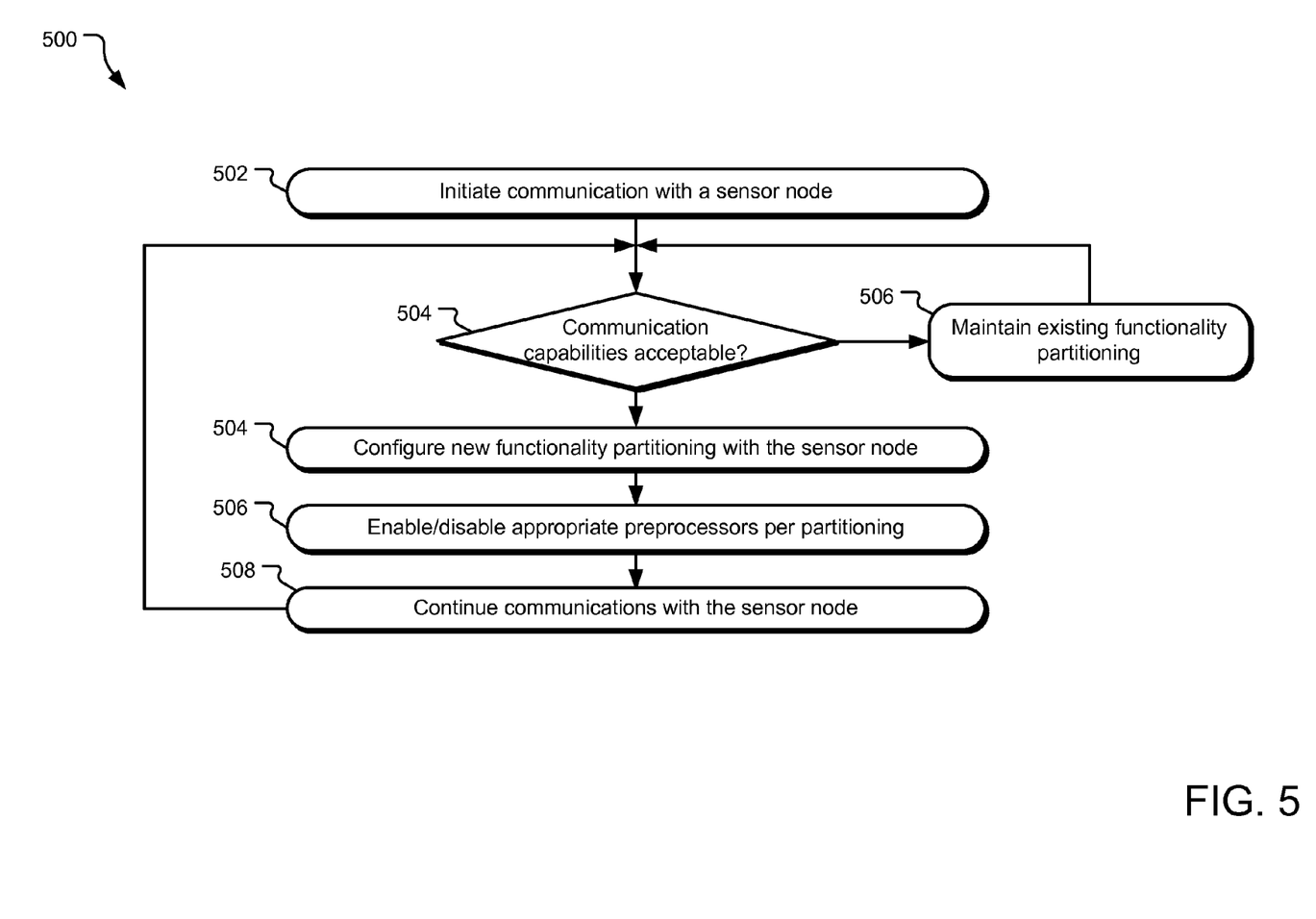
FIG. 5 illustrates example operations for dynamically partitioning functionality from the perspective of a processing subsystem.

FIG. 5 illustrates example operations 500 for dynamically partitioning functionality from the perspective of a processing subsystem. A communications operation 502 initiates communications with a sensor node. As previously discussed, such communications may be accomplished via a variety of communications channels. A communications monitoring operation 504 monitors the communications capabilities of the communications channel (e.g., available bandwidth, congestion, jitter, dropped packets, delay in delivery to destination, etc.). If the communications capabilities of the communications channel are acceptable for the current operation of the sensor node and the processing subsystem, the existing partitioning of functionality is maintained between the sensor node and the processing subsystem by operation 506, and communication continues.

The communications capabilities of the communications channel are periodically re-evaluated by the communications monitoring operation 504. If the communications capabilities of the communication channel become inadequate (e.g., excessive packets are being dropped) for the current operation of the sensor node and the processing subsystem, a configuring operation 508 reallocates functionality between the sensor node and the processing subsystem (e.g., to reparation the overall system functionality). Responsive to the configuring operation 508, a preprocessor selection operation 510 enables or disables select preprocessors in the processing subsystem in accordance with the new functionality partitioning. A communications operation 512 continues the communication of sensor data between the sensor node and the processing subsystem, subject to the new functionality partitioning, and the new communications arrangement is periodically re-evaluated by the communications monitoring operation 504. After each repartitioning operation 310, the sensor data stream is changed in some way (e.g., to a different type or level of compression, to a different level of noise cancellation, etc.). In one perspective, the original sensor data stream terminates and a second sensor data stream commences.

For example, if the communications capabilities improve to provide additional available bandwidth, the processor subsystem may instruct the sensor node to send uncompressed sensor data to take advantage of the additional bandwidth. In such a case, the sensor node may be instructed to (or may automatically) disable compression of the detected sensor data based on one of its own preprocessor blocks. In contrast, if the communications capabilities degrade to further constrain the available bandwidth, the processing subsystem may instruct the sensor node to send fewer frames per second or perform spatial image compression or temporal motion compensation via one of the sensor node's preprocessors to accommodate the drop in bandwidth. Such accommodations may be negotiated back and forth between the sensor node and the processing subsystem or simply imposed by instruction by one or the other. Accordingly, the new functionality partitioning adjusts the communications requirements and/or utilization between the sensor node and the processing subsystem.

Figure 6:
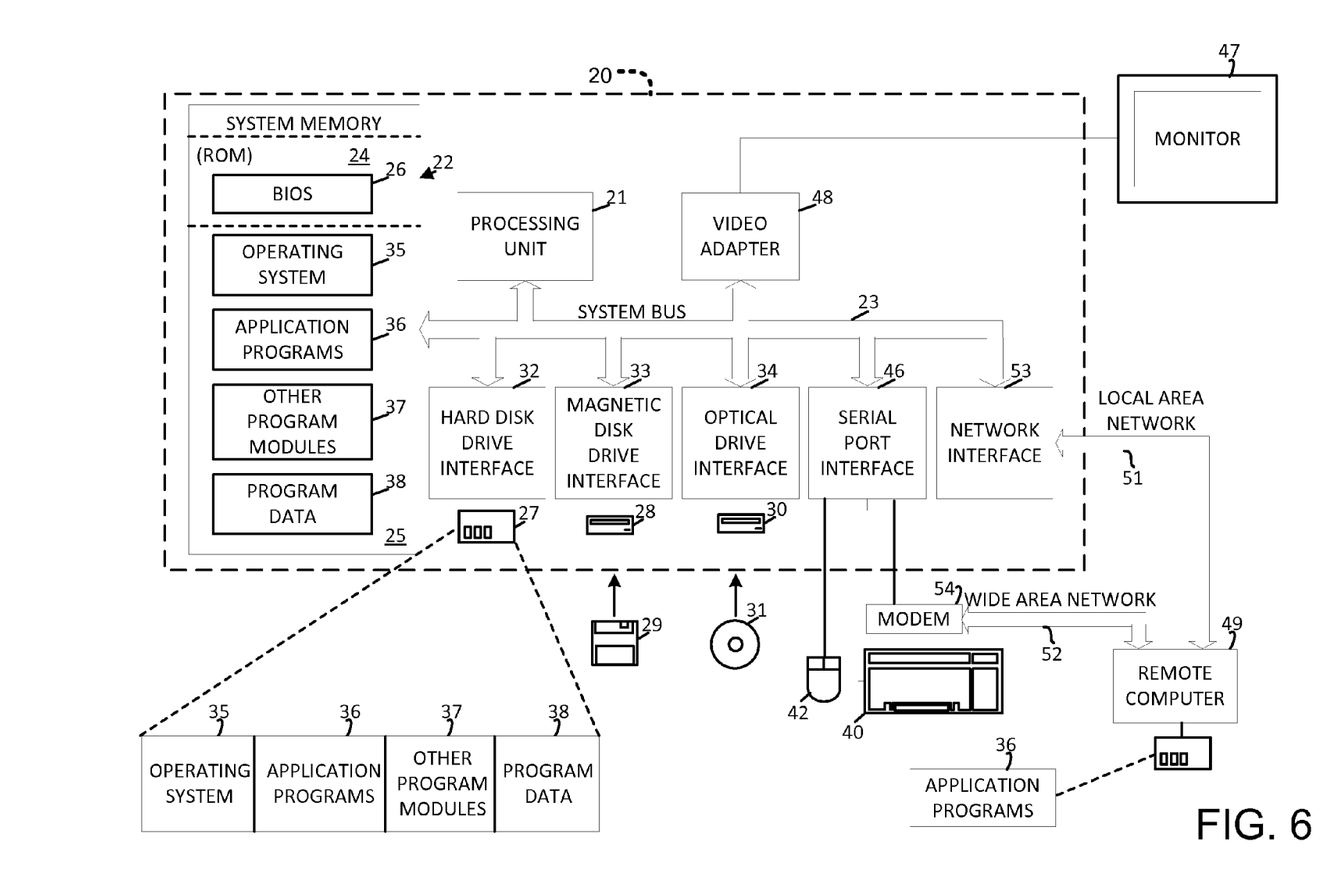
FIG. 6 illustrates an example system that may be useful in implementing the described technology.

FIG. 6 illustrates an example system that may be useful in implementing the described technology. The example hardware and operating environment of FIG. 6 for implementing the described technology includes a computing device, such as general purpose computing device in the form of a gaming console or computer 20, a mobile telephone, a personal data assistant (PDA), a set top box, or other type of computing device. One or more portions of the example system may be implemented in the form of a system-on-a-chip (SOC). In the implementation of FIG. 6, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, a joystick, a game pad, a gesture detector, a touch screen, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions for controlling sensor subsystem circuitry, preprocessor circuitry, a communication interface, a partitioning controller and other hardware/software blocks stored in memory 22 and/or storage devices 29 or 31 and processed by the processing unit 21. The sensor data, communication capability parameters, and other data may be stored in memory 22 and/or storage devices 29 or 31 as persistent datastores.

Figure 7:
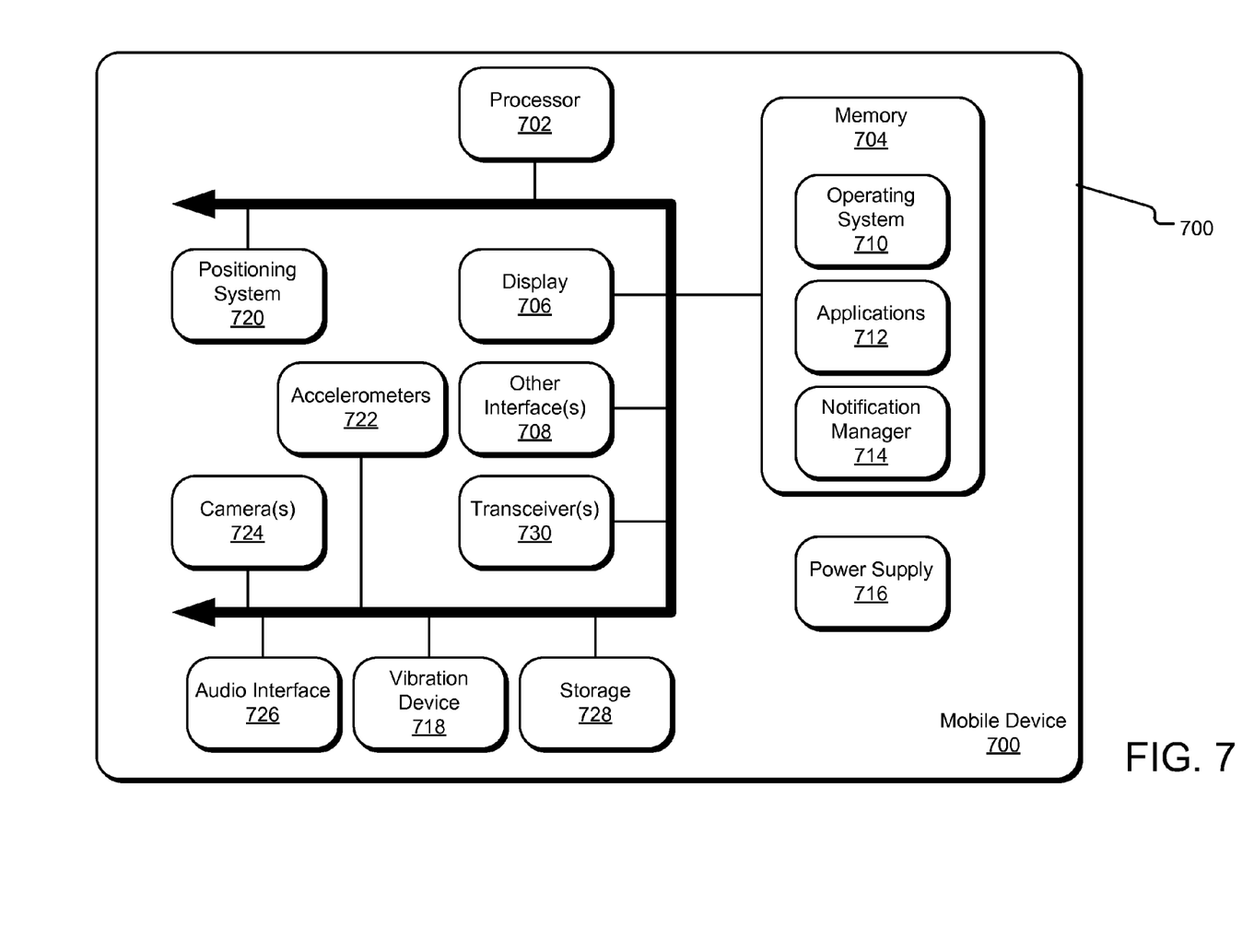
FIG. 7 illustrates another example sensor node that may be useful in implementing the described technology.

FIG. 7 illustrates another example sensor node (labeled as a mobile sensor 700) that may be useful in implementing the described technology. The mobile sensor 700 includes a processor 702, a memory 704, a display 706 (e.g., a touchscreen display), and other interfaces 708 (e.g., a keyboard, a camera, a microphone, etc.), although sensor nodes may have more or fewer components. For example, an emissions monitoring sensor may be positioned in an industrial emissions vent and therefore have no need for user input and output interfaces. The memory 704 generally includes both volatile memory (e.g., RAM) and non-volatile memory (e.g., flash memory). An operating system 710, such as the Microsoft Windows® Phone 8 operating system, may reside in the memory 704 and is executed by the processor 702, although it should be understood that other operating systems may be employed.

One or more application programs 712 may be loaded in the memory 704 and executed on the operating system 710 by the processor 702. Examples of application programs 712 include without limitation applications for use with one or more preprocessor blocks, etc. The mobile sensor 700 includes a power supply 716, which is powered by one or more batteries or other power sources and which provides power to other components of the mobile sensor 700. The power supply 716 may also be connected to an external power source that overrides or recharges the built-in batteries or other power sources.

The mobile sensor 700 includes one or more communication transceivers 730 to provide network connectivity (e.g., mobile phone network, Wi-Fi®, BlueTooth®, Ethernet, etc.). The mobile sensor 700 may also include various other components, such as a positioning system 720 (e.g., a global positioning satellite transceiver), one or more accelerometers 722, one or more cameras 724, an audio interface 726 (e.g., a microphone, an audio amplifier and speaker and/or audio jack), and additional storage 728. Other configurations may also be employed.

In an example implementation, software or firmware instructions for controlling sensor subsystem circuitry, preprocessor circuitry, a communication interface, a partitioning controller and other hardware/software blocks may be embodied by instructions stored in memory 704 and/or storage devices 728 and processed by the processor 702. The sensor data, communication capability parameters, and other data may be stored in memory 704 and/or storage devices 728 as persistent datastores. One or more portions of the example sensor node may be implemented in the form of a system-on-a-chip (SOC).

Some embodiments may comprise an article of manufacture. An article of manufacture may comprise a tangible storage medium to store logic. Examples of a tangible storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   detecting communication capabilities of a communications channel between a sensor node and a processing subsystem, the communications channel carrying a sensor data stream from the sensor node to the processing subsystem, the sensor node being located at a different location than the processing subsystem; and
   adjusting allocation of functionality between the sensor node and the processing subsystem based on the detected communication capabilities, wherein the adjusting the allocation of functionality causes one of the sensor node or the processing subsystem to perform a process on sensor data and causes the other of the sensor node or the processing subsystem to not perform the process on the sensor data, thereby changing characteristics of the sensor data communicated in the sensor data stream.

2. The method of claim 1 wherein the characteristics of the sensor data communicated between the sensor node and the processing subsystem in the sensor data stream before the adjusting the allocation of functionality and the characteristics of data communicated between the sensor node and the processing subsystem in the sensor data stream after the adjusting the allocation of functionality differ by a communication bandwidth used to communicate the sensor data between the sensor node and the processing subsystem.

3. The method of claim 1 wherein the characteristics of the sensor data communicated between the sensor node and the processing subsystem in the sensor data stream before the adjusting the allocation of functionality and the characteristics of data communicated between the sensor node and the processing subsystem in the sensor data stream after the adjusting the allocation of functionality differ by a level of encryption applied to the sensor data communicated between the sensor node and the processing subsystem.

4. The method of claim 1 wherein the processing subsystem and the sensor node each include a preprocessor block that performs the same preprocessor functionality.

5. The method of claim 4 wherein at least one of the processing subsystem and the sensor node further includes a preprocessor block that provides preprocessor functionality that is not provided by the other of the processing subsystem or the sensor node.

6. The method of claim 1 wherein the adjusting the allocation of functionality comprises:
   enabling one or more preprocessor blocks of at least one of the sensor node or the processing subsystem to accommodate a change in communication channel bandwidth.

7. The method of claim 1 wherein the adjusting the allocation of functionality comprises:
   disabling one or more preprocessor blocks of at least one of the sensor node or the processing subsystem to accommodate a change in communication channel bandwidth.

8. The method of claim 1 wherein the adjusting the allocation of functionality comprises:
   enabling a preprocessor block of one of the sensor node or the processing subsystem; and
   disabling a corresponding preprocessor block in the other one of the sensor node or the processing subsystem.

9. A computer memory having encoded thereon computer-executable instructions that upon execution configure a computer to perform operations comprising:
   detecting communication capabilities of a communications channel between a sensor node and a processing subsystem, the communications channel carrying a sensor data stream from the sensor located at a first location and the processing subsystem located at a second location; and
   adjusting allocation of functionality provided by preprocessor blocks between the sensor node and the processing subsystem based on the detected communication capabilities, wherein the adjusting the allocation of functionality causes one of the sensor node or the processing subsystem to perform a process on sensor data and causes the other of the sensor node or the processing subsystem to not perform the process on the sensor data, thereby changing characteristics of the sensor data communicated in the sensor data stream.

10. The computer memory of claim 9 wherein the adjusting the allocation of functionality comprises:
    enabling one or more preprocessor blocks of at least one of the sensor node or the processing subsystem to perform the function and to accommodate a change in communication channel bandwidth.

11. The computer memory of claim 9 wherein the adjusting the allocation of functionality comprises:
    disabling one or more preprocessor blocks of at least one of the sensor node or the processing subsystem to accommodate a change in communication channel bandwidth.

12. The computer memory of claim 9 wherein the adjusting the allocation of functionality comprises:
    enabling a preprocessor block of one of the sensor node or the processing subsystem; and
    disabling a corresponding preprocessor block in the other one of the sensor node or the processing subsystem.

13. A system comprising:
    one or more memories;
    one or more processors coupled to the one or more memories;
    one or more modules stored in the one or more memories and operable on the one or more processors, the one or more modules comprising:
       a communications interface module configured to detect communication capabilities of a communications channel between a sensor node and a processing subsystem, the communications channel carrying a first sensor data stream; and
       a partitioning controller module configured to adjust allocation of functionality between the sensor node and the processing subsystem based on the detected communication capabilities, wherein the adjusting the allocation of functionality causes one of the sensor node or the processing subsystem to perform a process on sensor data and causes the other of the sensor node or the processing subsystem to not perform the process on the sensor data, thereby changing characteristics of the sensor data communicated in the sensor data stream.

14. The system of claim 13 wherein the characteristics of the data in the sensor data stream before the adjusting the allocation of functionality and the characteristics of the sensor data in the sensor data stream after the adjusting the allocation of functionality differ by an amount of preprocessing performed on the sensor data by the sensor node or the processing subsystem.

15. The system of claim 13 wherein the processing subsystem and the sensor node each include one or more preprocessor blocks that are capable of performing overlapping preprocessor functionality.

16. The system of claim 13 wherein the processing subsystem and the sensor node each include a preprocessor block that performs the same preprocessor functionality.

17. The system of claim 16 wherein at least one of the processing subsystem and the sensor node further includes a preprocessor block that provides preprocessor functionality that is not provided by the other of the processing subsystem or the sensor node.

18. The system of claim 13 wherein the partitioning controller module is configured to adjust the allocation of functionality by enabling one or more preprocessor blocks of at least one of the sensor node or the processing subsystem to accommodate a change in communication channel bandwidth.

19. The system of claim 13 wherein the partitioning controller module is configured to adjust the allocation of functionality by disabling one or more preprocessor blocks of at least one of the sensor node or the processing subsystem to accommodate a change in communication channel bandwidth.

20. The system of claim 13 wherein the partitioning controller module is configured to adjust allocation of functionality by enabling a preprocessor block of one of the sensor node or the processing subsystem and disabling a corresponding preprocessor block in the other one of the sensor node or the processing subsystem.

* * * * *